US012360227B2

United States Patent
Hosseini et al.

(10) Patent No.: US 12,360,227 B2
(45) Date of Patent: Jul. 15, 2025

(54) SECURITY ENHANCEMENT FOR MULTI-USER RANGING SYSTEMS USING SIGNATURE ORTHOGONAL CHIRPS

(71) Applicant: Cypress Semiconductor Corporation, San Jose, CA (US)

(72) Inventors: Nozhan Hosseini, Aliso Viejo, CA (US); Pouria Zand, Irvine, CA (US); Kiran Uln, Pleasanton, CA (US); Claudio Rey, Chandler, AZ (US); Kambiz Shoarinejad, Tustin, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 563 days.

(21) Appl. No.: 17/748,903

(22) Filed: May 19, 2022

(65) Prior Publication Data

US 2023/0375688 A1 Nov. 23, 2023

(51) Int. Cl.
*G01S 13/34* (2006.01)
*G01S 7/40* (2006.01)
*H04B 1/69* (2011.01)
*H04B 1/713* (2011.01)

(52) U.S. Cl.
CPC .......... *G01S 13/343* (2013.01); *G01S 7/4056* (2013.01); *H04B 1/713* (2013.01); *H04B 2001/6912* (2013.01)

(58) Field of Classification Search
CPC .......... G01S 13/02; G01S 13/25; G01S 13/34; G01S 13/343; G01S 7/4056; H04B 1/713; H04B 2001/6912
See application file for complete search history.

(56) References Cited

U.S. PATENT DOCUMENTS

| 7,929,927 B2 | 4/2011 | Norris et al. |
| 9,794,056 B1 * | 10/2017 | Tamma ................... H04L 7/042 |
| 10,530,905 B1 | 1/2020 | Rey et al. |
| 10,819,544 B2 * | 10/2020 | Stanciu ............... H04B 1/7093 |
| 10,862,505 B1 | 12/2020 | Rey et al. |

(Continued)

FOREIGN PATENT DOCUMENTS

| EP | 3264701 B1 | 2/2019 |
| EP | 3706380 A1 | 9/2020 |

(Continued)

*Primary Examiner* — Peter M Bythrow

(57) ABSTRACT

Techniques described here introduce signature frequency modulation to unmodulated pulse signals as frequency chirps to enhance the security of multi-carrier phase-based ranging signals. The characteristics of the chirps may be mutually known by an initiator and a desired reflector of the ranging applications. The characteristics of the chirps may vary between the multi-carrier signals to thwart any attempt by an eavesdropper to predict the chirps. In one aspect, the characteristics of the chirps may be calculated for each timeslot of a ranging cycle by two authorized devices using a ciphering algorithm such as the Advanced Encryption Standard (AES) based on a shared security key. Each call of the AES may generate one or more pseudo-random numbers based on the shared security key and a time-varying initialization vector that increments every timeslot. Fields of the pseudo-random number may be extracted to determine the characteristics of the chirps associated with the timeslot.

20 Claims, 13 Drawing Sheets

(56) References Cited

U.S. PATENT DOCUMENTS

| | | | |
|---|---|---|---|
| 10,862,728 B1 | 12/2020 | Rey et al. | |
| 10,862,729 B1 | 12/2020 | Rey et al. | |
| 11,513,187 B2 * | 11/2022 | Stettiner | G01S 7/2883 |
| 11,520,003 B2 * | 12/2022 | Stettiner | G01S 7/0232 |
| 11,545,982 B2 | 1/2023 | Perin et al. | |
| 11,592,548 B2 * | 2/2023 | Kesaraju | G01S 13/589 |
| 11,621,898 B2 * | 4/2023 | Stanciu | G01S 5/0244 |
| | | | 375/355 |
| 11,656,322 B2 * | 5/2023 | Aydogdu | G01S 13/343 |
| | | | 342/60 |
| 2007/0211786 A1 * | 9/2007 | Shattil | H04J 13/00 |
| | | | 375/147 |
| 2019/0056476 A1 * | 2/2019 | Lin | G01S 7/021 |
| 2021/0373149 A1 * | 12/2021 | Zand | G01S 7/023 |
| 2022/0091227 A1 * | 3/2022 | Zhang | G01S 13/878 |
| 2022/0291325 A1 * | 9/2022 | Gulati | G01S 13/003 |
| 2023/0097689 A1 * | 3/2023 | Zand | H04L 27/0014 |
| | | | 375/262 |
| 2023/0350045 A1 * | 11/2023 | Yerramalli | G01S 13/34 |
| 2023/0358853 A1 * | 11/2023 | Kumari | H04L 27/2605 |
| 2024/0065570 A1 * | 2/2024 | Sundholm | A61B 5/05 |

FOREIGN PATENT DOCUMENTS

| | | |
|---|---|---|
| EP | 3737055 A1 | 11/2020 |
| EP | 3731478 A3 | 1/2021 |
| EP | 4064568 A1 | 9/2022 |

* cited by examiner

US 12,360,227 B2

SECURITY ENHANCEMENT FOR MULTI-USER RANGING SYSTEMS USING SIGNATURE ORTHOGONAL CHIRPS

TECHNICAL FIELD

This disclosure generally relates to technologies for positioning and ranging using wireless signals, and more particularly, to secure phase-based techniques for providing sub-meter accuracy and secure distance measurements for positioning and ranging applications using narrow-band radios such as Bluetooth technologies.

BACKGROUND

Ranging and localization applications such as secured entry, indoor positioning, asset tracking, etc., are increasingly relying on the use of narrow-band radios such as Bluetooth Low Energy (BLE) or IEEE 802.15.4 to provide sub-meter accuracy and secure distance measurements. For example, smart tags, smart phones, smart devices, Internet-of-Things (IoT) that use short-range BLE technologies for wireless communication may use BLE radios to perform ranging and positioning of other devices. In one such technique, two devices may calculate their range (also referred to as distance) by exchanging unmodulated pulses (also known as "constant tone" in the literature) and measuring the amount of signal-phase shifts between them. To mitigate multi-path fading, the two devices may measure phase shifts over multiple frequencies to achieve an acceptable accuracy. However, phase-based ranging solutions using unmodulated pulses are vulnerable to phase-manipulation attacks. For example, a man-in-the-middle (MITM) attacker may rotate the phase of its transmitted unmodulated pulses to intentionally introduce phase shifts to manipulate the distance measured by a receiving device. The receiving device may vary the pulse length or randomize the channels of the unmodulated pulses to enhance security, but these counter-measures may still not be secure enough against MITM attacks. It is desired to improve the security of phase-based ranging solutions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
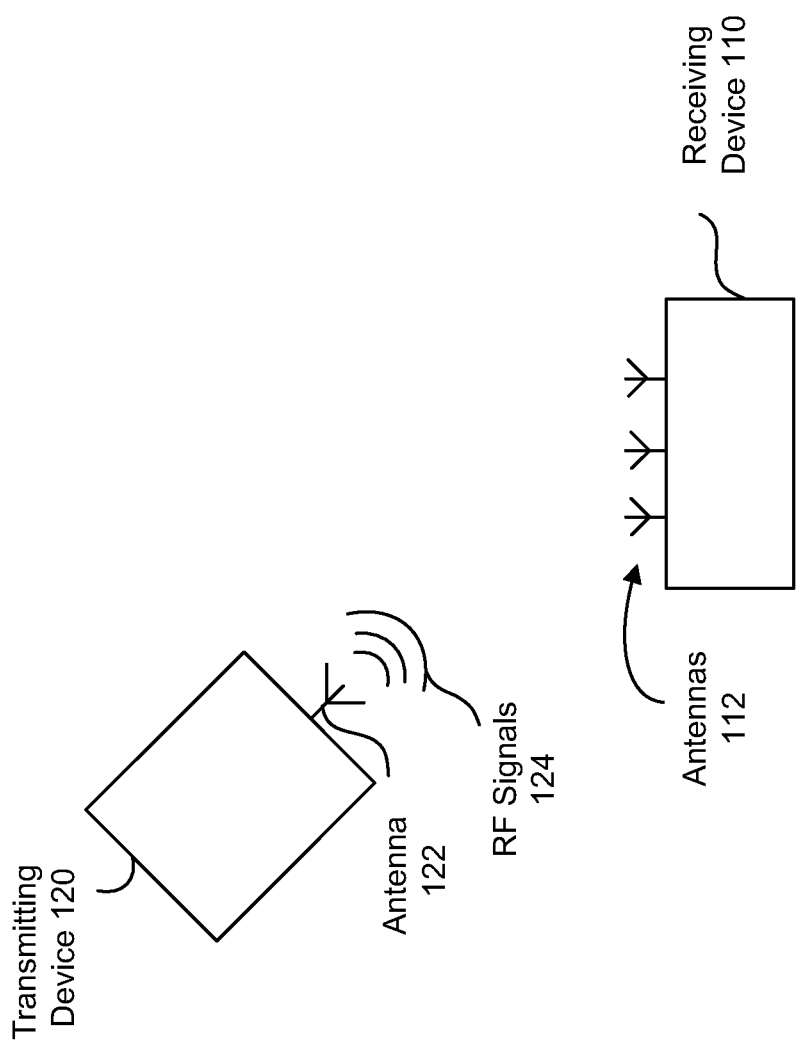
FIG. 1 is a block diagram illustrating a transmitting device transmitting unmodulated pulses for a receiving device to estimate a distance and a relative direction to the transmitting device, in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

Described are systems and methods for improving the security of phase-based ranging used in high accuracy positioning (HAP) applications using Bluetooth Low Energy (BLE), IEEE 802.15.4, or other short-range narrow-band radio technologies. One implementation of the HAP applications uses secure multi-carrier phase-based ranging for distance measurement and positioning, also referred to as multi-carrier phase difference (MCPD), in which the twoway phase difference between two devices is measured over multiple carriers. In phase-based ranging, the two devices, the initiator and the reflector, exchange multiple unmodulated pulses (UP) over different carrier frequencies to mitigate multi-path fading and interference. The initiator is the device that initiates the ranging and the reflector is the device that responds to the initiator request. In applications using phase-based ranging, the initiator and the reflector may perform phase measurements on each other's UP. For example, the initiator may send the UP toward the reflector. In response, the reflector may send back its own UP toward the initiator. At the end of the multiple UP exchanges, the initiator and the reflector may exchange their phase measurement results to estimate the range between the initiator and the reflector. In multi-carrier phase-based ranging operations, the ranging and positioning measurements may be repeated over multiple channels to mitigate multi-path fading.

HAP applications using unmodulated pulses in known patterns are prone to attacks by intruders such as man-in-the middle, phase manipulation, and phase roll-over attacks. For example, the attacker may intercept the UP received from the initiator or the reflector, and may introduce a phase shift in its transmitted UP to manipulate the range estimated by the initiator or the reflector. To enhance security, the devices may employ counter-measures such as using encryption schemes in layers higher than the radio access layer, varying the length of the UP, randomizing the channels carrying the UP, etc. However, these security enhancements may still not confer the devices with sufficient immunity against sophisticated phase-manipulation attacks.

Techniques described here introduce signature frequency modulation to the signals in the form of frequency orthogonal chirps (or referred to as simply chirps or frequency modulated continuous wave (FMCW)) to enhance the security of phase-based ranging signals. The characteristics of the chirps may be known to only the desired initiator and reflector. The characteristics of the chirps may vary between the channels of the multi-carrier UP or the timeslots of the ranging cycle carrying the multi-carrier UP to thwart any attempt by an attacker to predict the signature frequency chirps. In one aspect, the characteristics of the frequency chirps may be calculated for each timeslot by two authorized devices using a ciphering algorithm such as the Advanced Encryption Standard (AES) based on a known shared security key. Each call of the ciphering algorithm may generate a pseudo-random number based on the shared security key and a time-varying initialization vector that increments every timeslot. Fields of the pseudo-random number may be extracted to determine the characteristics of the chirps associated with the timeslots.

In one aspect, the characteristics of the chirps may include a starting frequency sweep and an end frequency sweep randomly selected from a range of possible frequency sweep variation. The range of possible frequency sweep variation may be limited by the frequency error of the crystals used to generate the channel frequencies in the devices, or by the channel bandwidth allocated for transmitting an UP. The initiator or the reflector may determine a starting carrier frequency for a timeslot by offsetting the channel frequency for the timeslot by the starting frequency sweep, and may determine an end carrier frequency for the timeslot by offsetting the channel frequency for the timeslot by the end frequency sweep. The devices may vary the carrier frequency linearly from the starting carrier frequency to the end carrier frequency while staying within the bounds of the range of possible frequency sweep variation over the duration of the timeslot.

In one aspect, the initiator may simultaneously transmit multiple UP signals, each modified with individualized orthogonal signature frequency chirps, to multiple reflectors in HAP applications among more than two devices. The characteristics of the chirps between the initiator and a specific reflector may be known only to the pair whose mutual range is to be estimated. The chirps transmitted from the initiator to the multiple reflectors may be orthogonal over the duration of a timeslot to minimize interference between concurrent UP transmissions. A reflector may determine the characteristics of its chirps to receive the UP signal intended only for the reflector. In one aspect, the characteristics of the chirps may include, in addition to the starting and end frequency sweeps randomly selected from the range of possible frequency sweep variation for each timeslot, a user identification (UID) randomly associated with each of the reflectors. The initiator or the reflector may determine a starting carrier frequency and an end carrier frequency for the timeslot based on the characteristics of the chirp.

FIG. 1 is a block diagram illustrating a transmitting device transmitting unmodulated pulses for a receiving device to estimate a distance and a relative direction to the transmitting device, in accordance with one aspect of the present disclosure. The transmitting device 120 is shown to transmit through antenna 122 unmodulated pulse RF signals 124 over multiple carrier frequencies. The unmodulated pulse RF signals may be modified with orthogonal frequency chirps to provide secure phase-based ranging, as will be described. The receiving device 110 is coupled to antennas 112 to receive the RF signals 124 to measure the phase to estimate the distance to the transmitting device 120. In one aspect, the receiving device may have multiple antennas to estimate the angle of arrival (AoA) of the RF signals 124 based on a phase difference concurrently acquired by different receive paths to estimate the relative direction to the transmitting device 120.

The transmitting device 120 may include circuitry to not only transmit RF signals but also to receive RF signals. Conversely, the receiving device 110 may include circuitry to not only receive RF signals but also to transmit RF signals. A phase-based ranging cycle may include multiple time-slots used by the two devices to exchange unmodulated pulses at different channels to estimate the distance. Each time-slot may include a receiving time interval during which a device receives an unmodulated pulse signal from the other device to measure its phase and a transmission time interval during which the first device transmits an unmodulated pulse signal for phase measurements by the other device. In each time-slot, the wireless device and the target device may exchange the unmodulated pulses in a different channel from the previous or the next time-slot.

The devices 110 and 120 may be connected as part of a Wireless Personal Area Network (WPAN), a Wireless Local Area Network (WLAN), or any other wireless networks. Communication protocols supported by the devices 110 and 120 may include, without limitation, Bluetooth, ZigBee, or Wi-Fi having frequencies in the Industrial, Scientific, and Medical (ISM) band. In one embodiment, the two devices may exchange 80 unmodulated pulse signals across the 80 MHz of the entire 2.4 GHz ISM band. In one embodiment, the ISM band may be at the millimeter-wave frequency such as the 60 GHz band to increase the channel bandwidth available for the chirps.

Figure 2:
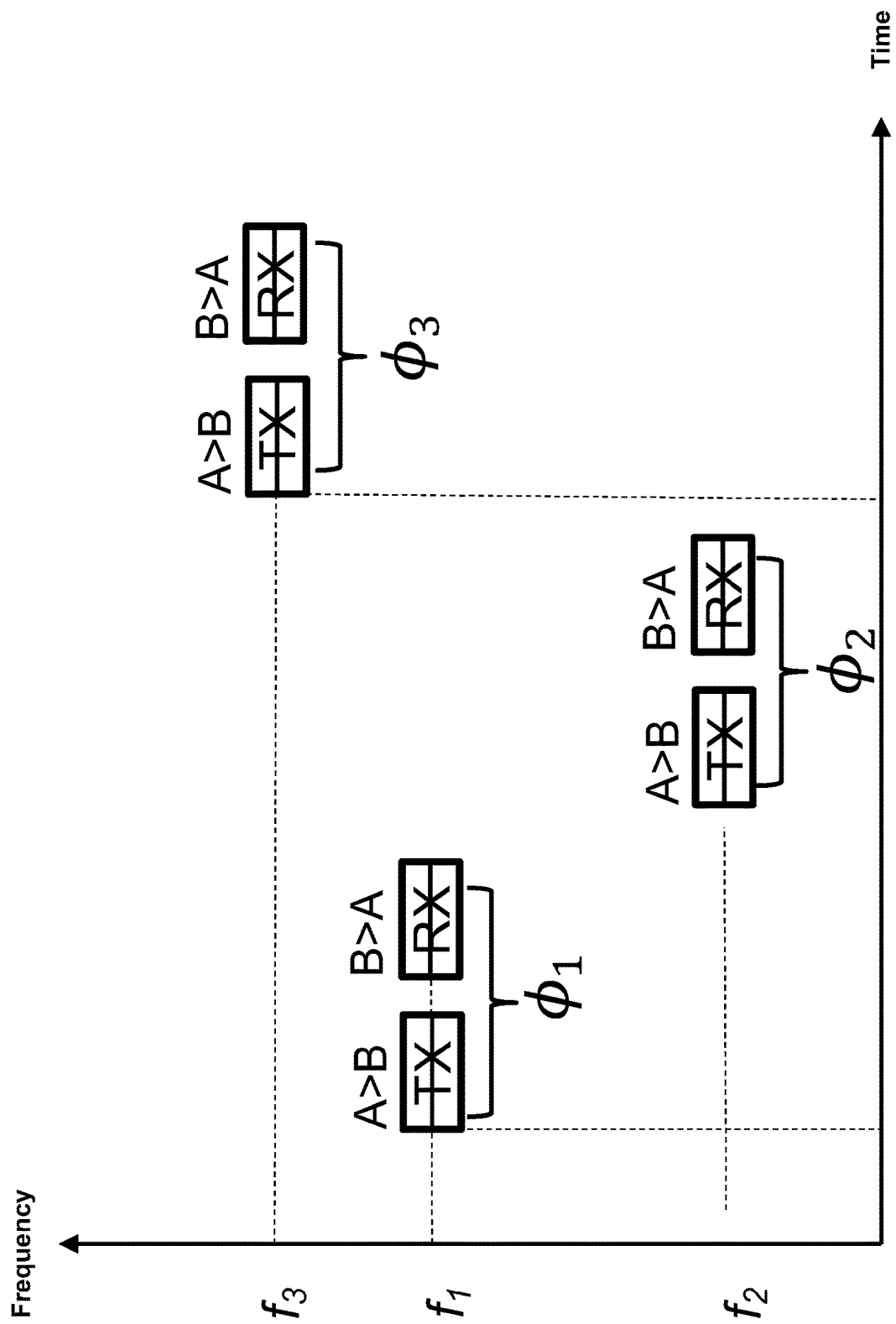
FIG. 2 illustrates two devices exchanging unmodulated pulse signals across multiple channels and measuring the phase shifts for the devices to estimate their mutual range, in accordance with one aspect of the present disclosure.

FIG. 2 illustrates two devices exchanging unmodulated pulses across multiple channels and measuring the phase shifts for the devices to estimate their mutual range, in accordance with one aspect of the present disclosure. An initiator designated device A starts the phase-based ranging cycle with a reflector designated device B.

Each ranging cycle may be divided into multiple timeslots. At the beginning of each cycle, in a calibration-synchronization timeslot (not shown), the initiator and the reflector may synchronize their timing and measure their frequency error offsets. After the devices are time synchronized and the frequency error offsets measured, the devices may be scheduled to perform the UP exchanges in subsequent timeslots in the cycle. At the beginning of each timeslot, the devices may switch to a new channel that will be used by the devices for performing the UP exchanges in the timeslot.

For example, at a first timeslot for the UP exchange, the initiator may transmit an UP signal to the reflector on a first channel $f_1$. The reflector may perform phase (or I/Q) measurement on the received UP signal. The phase measurement may depend on the distance between the initiator and the reflector, and the phase difference between the reflector's local oscillator (LO) used to receive the UP signal and the initiator's LO used to transmit the UP signal. The reflector may measure a phase of $\Phi_{Ref}$. Following this, the reflector may transmit back an UP signal to the initiator on the same channel $f_1$ so that the initiator may perform its phase measurement. The initiator may measure a phase of $\Phi_{Ini}$ on its received UP signal. At the end of the ranging cycle, the reflector may transmit its measured phase $\Phi_{Ref}$ to the initiator. The initiator may sum its measured phase $\Phi_{Ini}$ with the phase $\Phi_{Ref}$ measured by the reflector to generate $\Phi_1$, which may represent the phase difference experienced by the UP signal of channel $f_1$ after traversing twice the distance between the initiator and the reflector.

To enhance the security of the UP signal from being intercepted by an intruder or an eavesdropper who may launch a phase-manipulation attack, the UP signal on channel $f_1$ may be offset with chirps known to only the initiator and the reflector over a timeslot. The reflector or the initiator may determine the chirps so it may perform the phase measurements by receiving the UP signal with the matching chirps while rejecting intruder-launched UP signals on the same channel.

At a second timeslot, the initiator and the reflector may exchange UP signals on a second channel $f_2$. The reflector and the initiator may respectively measure a phase on the received UP signal on channel $f_2$. The reflector may transmit its measured phase to the initiator for the initiator to sum its measured phase with the phase measured by the reflector to generate $\Phi_2$, which may represent the phase difference experienced by the UP signal of channel $f_2$ after traversing twice the distance between the initiator and the reflector. Similarly, at a third timeslot, the initiator and the reflector may exchange UP signals on a third channel $f_3$. The resulting phase difference $\Phi_3$ may represent the phase difference experienced by the UP signal of channel $f_3$ after traversing twice the distance between the initiator and the reflector.

The UP signals on channels $f_2$ and $f_3$ may be offset with frequency chirps over the second and third timeslots, respectively. The characteristics of the chirps for the different timeslots of the ranging cycle may be different to make it difficult for the attacker to predict the chirps. In one aspect, the characteristics of the chirps may be determined by the initiator and the reflector using a cyphering algorithm based on a known shared security key. The initiator may estimate the range to the reflector based on a slope of the phase differences $\Phi_1$, $\Phi_2$, and $\Phi_3$ as a function of the channel frequencies.

Figure 3:
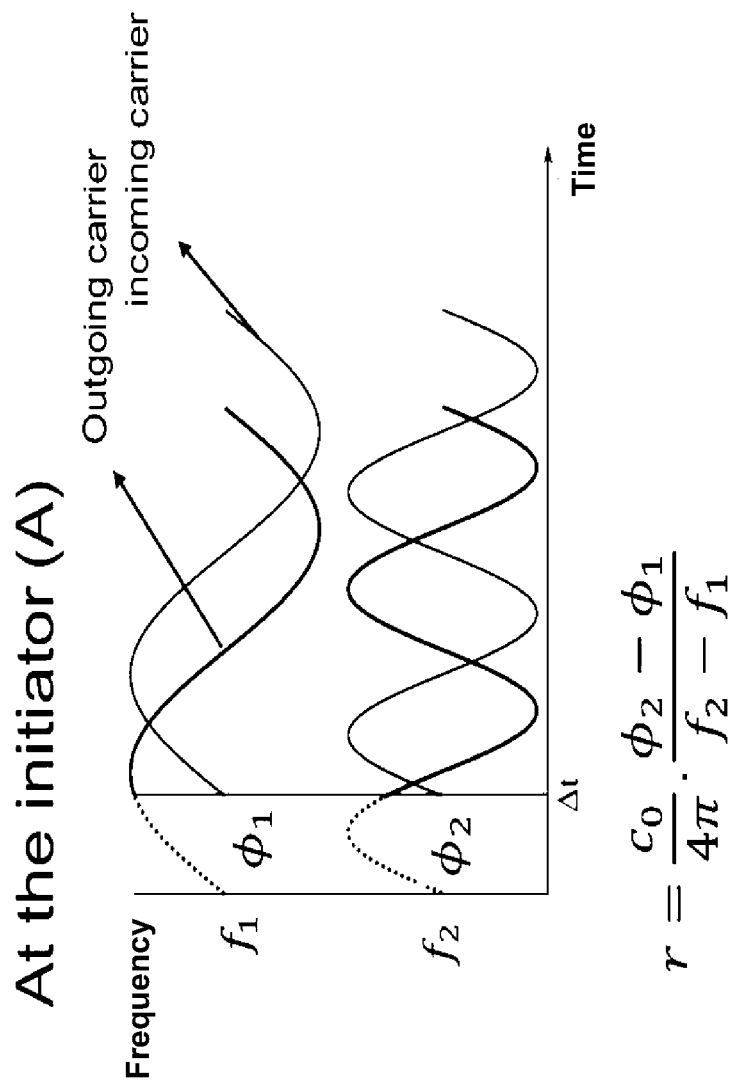
FIG. 3 illustrates an initiator estimating the distance (also known as ranging) to a reflector based on phases measured by the initiator and the reflector for two frequency tones (e.g., channels), in accordance with one aspect of the present disclosure.

FIG. 3 illustrates an initiator estimating the distance to a reflector based on phases measured by the initiator and the reflector for two frequency tones (e.g., channels), in accordance with one aspect of the present disclosure.

As indicated, the range between the initiator and the reflector may be a function of the slope of the phase differences as a function of the channel frequencies. $\Phi_1$ may represent the phase difference experienced by the UP signal of channel $f_1$ after traversing twice the distance between the initiator and the reflector, and $\Phi_2$ may represent the phase difference experienced by the UP signal of channel $f_2$ after traversing twice the distance between the initiator and the reflector. By taking the difference between $\Phi_1$ and $\Phi_2$, the range may be estimated by:

$$r = \frac{c_0}{4\pi} \cdot \frac{\Phi_2 - \Phi_1}{f_2 - f_1} \tag{Eq. 1}$$

where r is the range, $c_0$ is the speed of light in a vacuum. The range ambiguity may be equal to $c_0/(2(f_2-f_1))$, which is a function of the frequency difference between the two channels.

The estimating of the range may be extended based on the phase differences measured from more than two channels. For example, the initiator and the reflector may exchange 37 unmodulated pulses signals using the 37 2-Mhz data channels across the 80 MHz bandwidth of the 2.4 GHz ISM band in the BLE standard. By averaging the difference between pairs of $(\Phi_1, \Phi_2)$, $(\Phi_2, \Phi_3)$ . . . $(\Phi_{36}, \Phi_{37})$, where $\Phi_k$ represents the phase difference experienced by the UP signal of channel $f_k$ after traversing twice the distance between the initiator and the reflector, the range may be estimated by:

$$r = \frac{c_0}{4\pi} \cdot \frac{\Phi_{37} - \Phi_1}{f_{37} - f_1} \tag{Eq. 2}$$

where $f_1$ represents channel 1 or the lowest channel frequency, and $f_{37}$ represents channel 37 or the highest channel frequency of the data channels. Thus, the bandwidth may be effectively increased by a factor of 37 without reducing the range ambiguity. As a result, the range estimate may be less sensitive to phase errors.

Figures 4A, 4B:
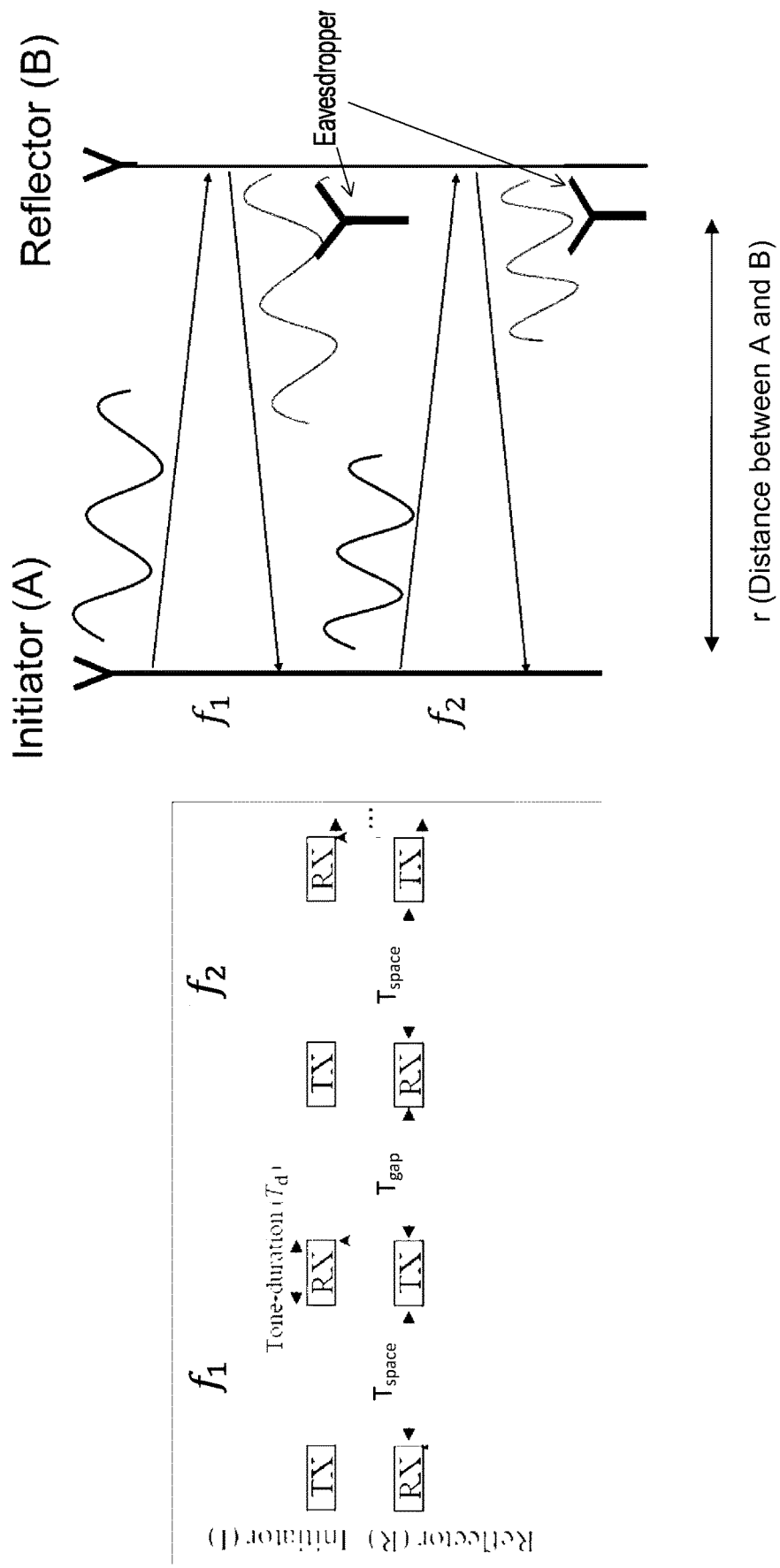
FIG. 4A illustrates the timing of two timeslots of a phase-based ranging cycle in which the initiator and the reflector exchange unmodulated pulses in two frequency channels, in accordance with one aspect of the present disclosure.
FIG. 4B illustrates an eavesdropper mounting a main-in-the-middle (MITM) phase-manipulation attack to manipulate the range estimated by the initiator.

FIG. 4A illustrates the timing of two timeslots of a phase-based ranging cycle in which the initiator and the reflector exchange unmodulated pulses in two frequency channels, in accordance with one aspect of the present disclosure.

At the beginning of a first timeslot, the initiator may transmit an UP signal on channel frequency $f_1$ for the reflector to perform phase measurements. The channel frequency $f_1$ may be offset with frequency chirps known to only the initiator and the reflector. The reflector may determine the chirps so it may perform the phase measurements by receiving the UP signal with the matching chirps. After an interlude time/space between UP signals in the same timeslot, which may be designated $T_{space}$, the reflector may transmit an UP signal on $f_1$ offset with frequency chirps for the initiator to perform phase measurements. Reciprocally, the initiator may determine the chirps on the received UP signal to perform the phase measurements. The characteristics of the frequency chirps between the UP transmissions exchanged between the initiator and the reflector may be different. The duration of the UP signal transmissions may be designated $T_d$.

After interval time delay/gap from the end of one slot to the beginning of the next timeslot, which may be designated $T_{gap}$, the initiator and the reflector may exchange UP signals on channel frequency $f_2$ offset with frequency chirps in a second timeslot for the reflector and the initiator, respectively, to perform phase measurements. The frequency chirps for the second timeslot may be different from those for the first timeslot. The time delay between UP transmissions by the same device from two consecutive timeslots, which may be deemed the duration of the timeslot, is then $(T_{space}+2T_d+T_{gap})$. The span of frequency sweep of the chirps for each UP transmission may be limited by the frequency errors of the crystals of the initiator and the reflector used to generate the frequency chirps and the time for the phase measurements. The frequency errors of the crystals are typically measured in part-per-million (ppm). The ppm of the crystals of the initiator and reflector may cause a divergence in the frequency chirps generated by the two devices over the UP transmission duration $T_d$ and a timing offset in the phase measurement made by the two devices, causing an error in the range estimate. The error in the range estimate due to the frequency errors of the crystals may be more sensitive to the UP transmission duration $T_d$ and $T_{space}$ than $T_{gap}$. Limiting the span of frequency sweep of the chirps of the UP transmission may reduce the error in the range estimate.

FIG. 4B illustrates an eavesdropper mounting a main-in-the-middle (MITM) phase-manipulation attack to manipulate the range estimated by the initiator. The eavesdropper may intercept an unencrypted UP transmission from the initiator and may introduce a phase shift in its transmitted UP signal. The phase shift changes the $\Phi_k$ (see Eq. 1 and Eq. 2) representing the phase difference experienced by the UP signal of channel $f_k$ after traversing twice the distance between the initiator and the eavesdropper, thus allowing the eavesdropper to manipulate the range r estimated by the initiator. To protect the security of the UP ranging signals against the MITM attack, the UP signals may be offset with the frequency chirps known to only the initiator and the reflector as described.

Figure 5:
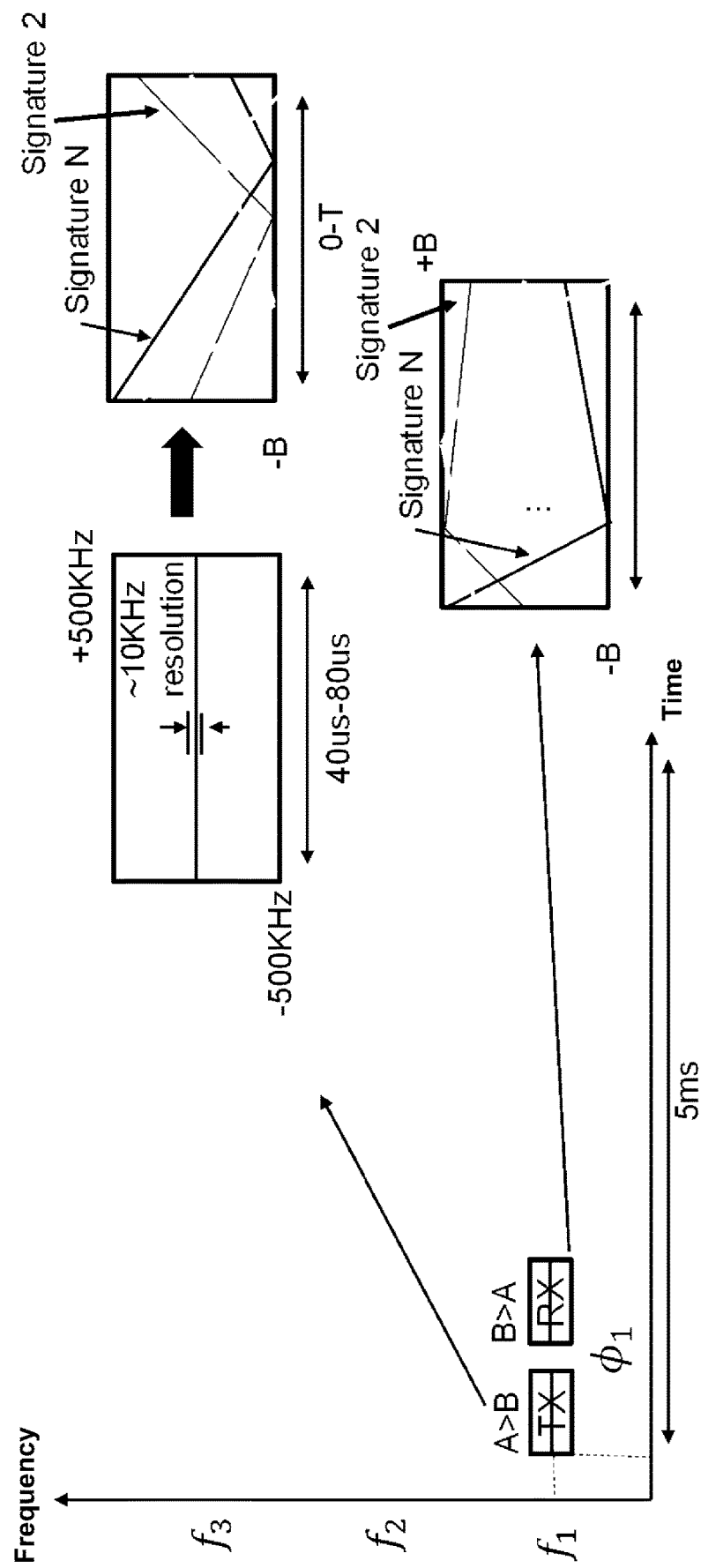
FIG. 5 illustrates the initiator and the reflector adding mutually-known varying frequency sweeps or chirps to a pulse of a phase-based ranging timeslot to protect against MITM attacks, in accordance with one aspect of the present disclosure.

FIG. 5 illustrates the initiator and the reflector adding mutually-known varying frequency sweep or chirps to a frequency tone of a phase-based ranging timeslot to protect against MITM attacks, in accordance with one aspect of the present disclosure.

At the beginning of a first timeslot, the initiator may transmit an UP signal on channel frequency $f_1$ offset with signature chirps to the reflector for the reflector to perform phase measurements. The signature chirps may include a starting frequency sweep and an end frequency sweep randomly selected from a range of frequency sweep variation. The span of frequency sweep may be limited by the frequency error of the crystals in the initiator and the reflector, as discussed, or by the bandwidth of the channel frequency $f_1$. Reciprocally during the first timeslot, the reflector may transmit an UP signal on channel frequency $f_1$ offset with signature chirps different from that of the UP signal transmitted by the initiator.

FIG. 5 shows that the arbitrary range of frequency sweep variation spans from −500 kHz to +500 kHz for a 2 MHz channel bandwidth of the 2.4 GHz ISM band of the BLE. The resolution of the starting frequency sweep and the end frequency sweep may be set to 10 kHz, allowing for 100 different starting frequency sweeps or 100 different end frequency sweeps to be randomly chosen from the 1 MHz range of frequency sweep variation. The number of signature chirps with unique starting frequency sweep and end frequency sweep may thus be 10,000. The signature chirps may change from UP transmission to UP transmission and from timeslot to timeslot, making it virtually impossible for an eavesdropper to predict the signature chirps. In one embodiment, when operating using the larger channel bandwidth of the ISM band at the millimeter-wave frequency (e.g., 60 GHz), the range of frequency sweep variation may increase to allow an even larger number of unique signature chirps.

The duration of the chirps, which may be equal to the duration of each UP transmission of the timeslot, may be between 10-100 μs. At the beginning of each UP transmission, the channel frequency may be offset by the selected starting frequency sweep of the signature chirps. At the end of each UP transmission, the channel frequency may be offset by the selected end frequency of the signature chirps. The chirps may vary linearly from the starting frequency sweep to the end sweep while staying within the bounds of the range of frequency sweep variation over the duration of the pulse transmission. FIG. 5 shows that for the signature chirps from the initiator to the reflector, the frequency sweep varies linearly from the selected starting frequency sweep down to −500 kHz, and from −500 kHz up to the selected end frequency sweep over the duration of the pulse transmission. For the signatures chirps from the reflector to the initiator, the frequency sweep varies linearly from the selected starting frequency sweep up to +500 kHz, and from +500 kHz down to the selected end frequency sweep over the duration of the UP transmission. In some embodiments, the frequency sweep of the signature chirps from the starting frequency sweep to the end frequency sweep may vary non-linearly over the duration of the UP transmission.

Figure 6:
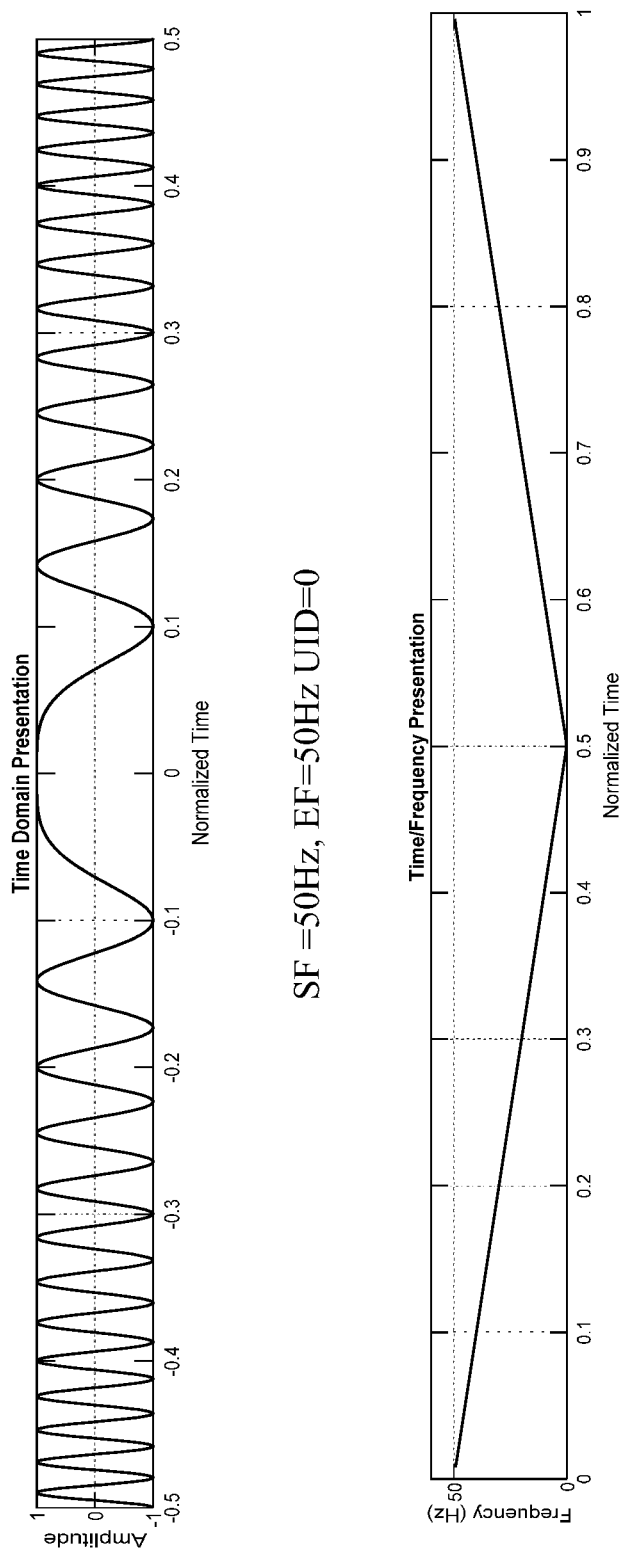
FIG. 6 illustrates the time domain representation and the frequency domain representation of the single frequency chirp signature example of a phase-based ranging timeslot in which the frequency chirps vary linearly from an arbitrary starting frequency to an arbitrary end frequency over the chirp duration, in accordance with one aspect of the present disclosure.

FIG. 6 illustrates the time domain representation and the frequency domain representation of the single frequency chirp example of a phase-based ranging timeslot in which the frequency chirps vary linearly from an arbitrary starting frequency sweep to an arbitrary end frequency sweep over the chirp duration, in accordance with one aspect of the present disclosure.

In the frequency chirp of FIG. 6, the starting frequency sweep, referred to as SF, and the end frequency sweep, referred to as EF, are both set at 50 Hz. The SF and EF are selected from a range of frequency sweep variation that spans from 0 to B Hz. The duration of the frequency chirps has been normalized to 1 for simplicity. The time domain representation shows the timing waveform of the frequency chirps decreasing from SF to 0 Hz during the first half of the chirp duration, and increasing from 0 Hz to EF during the second half of the chirp duration. The time-frequency domain representation shows more clearly the linear variation of the frequency chirps over the chirp duration, with the frequency chirps reaching 0 Hz at the mid-point of the chirp duration.

In one aspect, the waveform of the frequency chirps (which may be referred to as orthogonal frequency chirps) in the time domain may be expressed as:

$$s(t) = e^{\left(\frac{j\pi\psi}{T^2}\left(t+UID\frac{T}{\psi}\right)^2\right)}, \frac{-SF \times T}{\psi} < t < \frac{EF \times T}{\psi} \quad \text{(Eq. 3)}$$

where
starting frequency sweep SF∈[0-B];

end frequency sweep EF∈[0-B];
user ID UID∈ ℤ;
Ψ=SF+EF;
T is the chirp duration; and $$\frac{\psi}{T}$$

is the bandwidth;

The UID may be randomly selected from a range of values to introduce even more variability into the orthogonal frequency chirps. In one aspect, the characteristics of the orthogonal frequency chirps including the SF, EF, UID may be calculated for each timeslot or each UP transmission by the initiator and the reflector using a ciphering algorithm such as the Advanced Encryption Standard (AES) based on a known shared security key. Each call of the ciphering algorithm may generate a pseudo-random number based on the shared security key and a time-varying initialization vector that increments every timeslot. Fields of the pseudo-random number may be extracted to determine the characteristics of the orthogonal frequency chirps associated with the timeslots or the UP transmissions.

For example, UID may be randomly selected from a range of [0:80] in resolution of 10, resulting in 8 possible values; SF and EF may be randomly selected from a range of frequency sweep variation within an interval such as [−250 kHz, 250 kHz] with a resolution of 10 kHz, resulting in 51 possible values each. The UID may be encoded using 4 bits; the SF and EF may each be encoded using 6 bits. The AES ciphering algorithm may run in the Counter (CTR) mode taking as its input a shared key between the initiator and the reflector, and an initialization vector (IV) or "nonce" to generate a 128-bit output. The IV or nonce is combined with a counter that increments based on the timeslot number. At each timeslot, both the initiator and the reflector may call the AES ciphering algorithm using the same IV and the shared key to generate a 128-bit pseudo-random number from which blocks of 16 bits may be selected to determine the UID, SF, and EF. The initiator and the reflector in each timeslot may have different chirp signatures. In one embodiment, the initiator and the reflector may call the AES ciphering algorithm once for every 4 timeslots that encompass 8 UP transmissions exchanged between the initiator and reflector. Each of the 8 UP transmissions may extract a different 16-bit subfield of the 128-bit pseudo-random number generated by the AES to determine the UID, SF, and EF of the frequency chirps.

Figure 7:
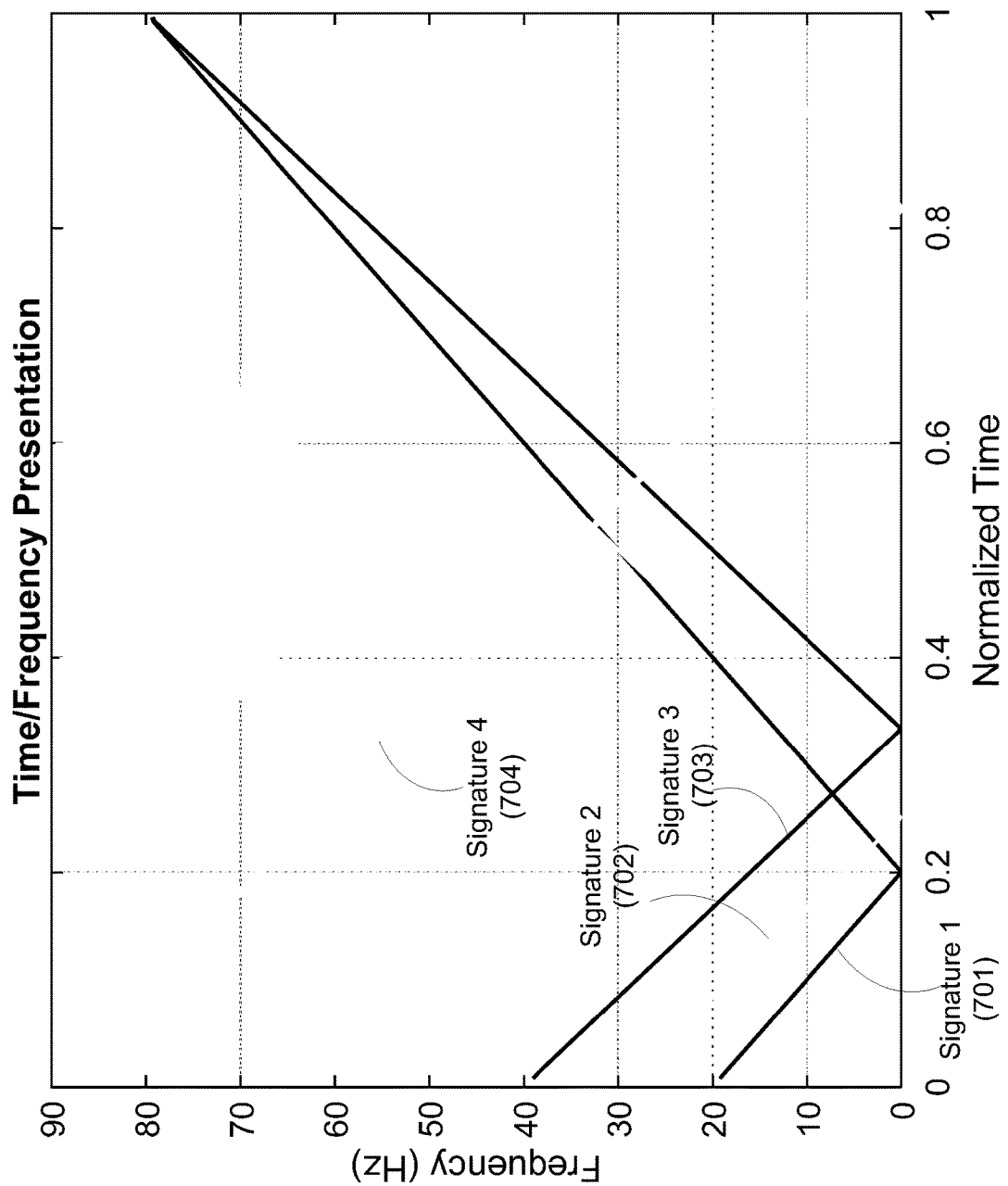
FIG. 7 illustrates the signature characteristics of several example chirps that exhibit different rates of frequency variation over a chirp duration, in accordance with one aspect of the present disclosure.

FIG. 7 illustrates the signature characteristics of several chirps that exhibit different rates of frequency variation over a chirp duration, in accordance with one aspect of the present disclosure.

The SF and EF of the signature chirps can be selected from a range of frequency sweep variation from 0 to 90 kHz in resolution of 10 kHz. The UID of all the signature chirps may be set to 0. FIG. 7 shows that for signature chirps 1 (701) the frequency sweep varies linearly from the SF of 20 kHz down to 0, and from 0 up to the EF of 80 kHz over the chirp duration; for signature chirps 2 (702) the frequency sweep varies linearly from the SF of 30 kHz down to 0, and from 0 up to the EF of 90 kHz over the chirp duration; for signature chirps 3 (703) the frequency sweep varies linearly from the SF of 40 kHz down to 0, and from 0 up to the EF of 80 kHz over the chirp duration; for signature chirps 4 (704) the frequency sweep varies linearly from the SF of 90 kHz down to 0, and from 0 up to the EF of 20 kHz over the chirp duration. Note that for signature chirps 2 (702) and 3 (703), the total span of frequency sweep (sum of SF and EF or Ψ in Equation 3) or the bandwidth (Ψ/T) is the same, yielding an identical rate of frequency sweep for the two signature chirps. FIG. 7 shows the frequency sweep decreasing from SF to 0 and then increasing from 0 to EF. In one embodiment, the frequency sweep may increase from SF to 90 kHz and then decrease from 90 kHz to EF. In one embodiment, the direction of the frequency sweep may be randomly chosen for each UP transmission as part of the characteristics of the chirps determined using a ciphering algorithm such as the AES.

In one aspect, the initiator may simultaneously transmit multiple signals, each modified with individualized signature frequency chirps, to multiple reflectors in ranging applications among more than two devices. The characteristics of the chirps between the initiator and a specific reflector may be known only to the pair whose mutual range is to be estimated. The chirps transmitted from the initiator to the multiple reflectors may be orthogonal over the duration of a timeslot to minimize interference between the multiple signals. A reflector may determine the characteristics of its chirps to receive the signal intended only for the reflector.

Figure 8:
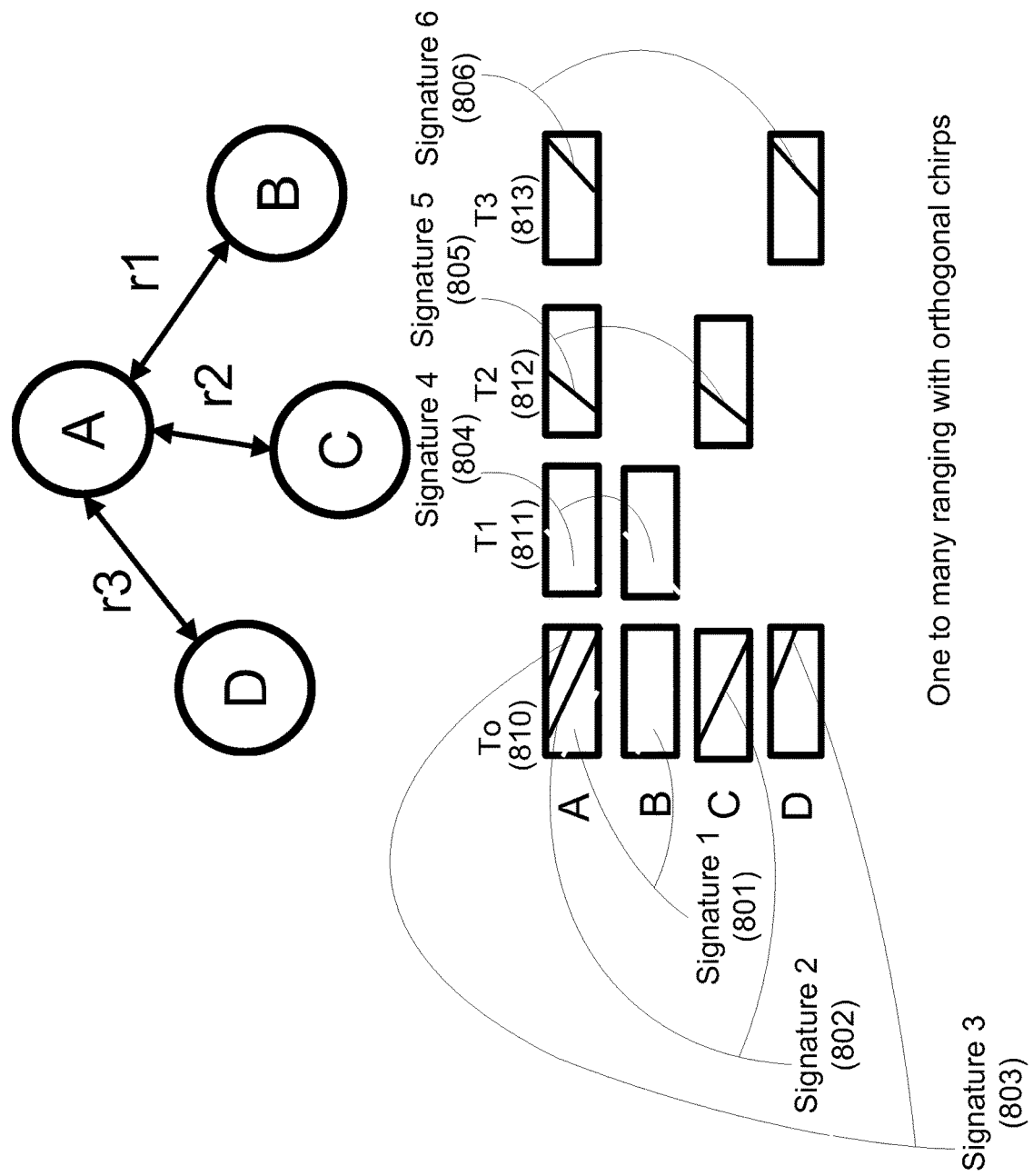
FIG. 8 illustrates an initiator exchanging orthogonal chirps with multiple reflectors to estimate the ranges between the initiator and each of the reflectors, in accordance with one aspect of the present disclosure.

FIG. 8 illustrates an initiator A exchanging orthogonal chirps with multiple reflectors B, C, and D to estimate the ranges r1, r2, and r3, respectively, between the initiator and the reflectors, in accordance with one aspect of the present disclosure. The initiator A and the reflectors B, C, and D may exchange signals on a channel frequency to perform phase measurements during a timeslot of a ranging cycle.

During interval T0 (810) of the timeslot, the initiator A may simultaneously transmit a signature chirp 1 (801) to reflector B selected out of a bank of orthogonal signature chirps, a signature chirp 2 (802) to reflector C, and a signature chirp 3 (803) to reflector D. The characteristics of the chirps may be different among the three signature chirps so that the three signature chirps are orthogonal over the chirp duration. For example, the SF and EF for signature chirps 1 (801), signature chirps 2 (802), and signature chirps 3 (803) may be different. In one embodiment, the SF and EF for the three signature chirps may be the same but the UID for the three reflectors may be different. The characteristics of the orthogonal frequency chirps for each reflector may be mutually known only to the reflector and the initiator A. Each reflector may determine the characteristics of its chirps so it may perform the phase measurements on the UP signal with the matching chirps received from initiator A.

In one embodiment, when using the AES ciphering algorithm to determine the characteristics of the chirps, the multiple reflectors may use different shared keys or initialization vectors to generate different pseudo-random number outputs. In one embodiment, the multiple reflectors may use the same shared keys and initialization vectors to generate the same pseudo-random number from each call of the AES ciphering algorithm, but the pseudo-random number may be further processed to generate the characteristics of the orthogonal frequency chirps unique to each reflector, such as by generating unique UID for each reflector.

After an interlude time/space ($T_{space}$), the transmissions signals from reflectors B, C, and D may be time-multiplexed to allow initiator A to perform its reciprocal phase measurements. For example, during interval T1 (811) of the timeslot, reflector B may select and transmit a signature chirp 4 (804) selected from a bank of orthogonal signature chirps for initiator A to perform the phase measurements. In a subsequent interval T2 (812) of the timeslot, reflector C may pick and transmit a signature chirp 5 (805), and in a last interval T3 (813) of the timeslot, reflector D may transmit a signature chirp 6 (806) for initiator A to perform the phase measurements. The characteristics of signature chirp 4 (804), signature chirp 5 (805), and signature chirp 6 (806) may be different or the same since the three signature chirps are serially received by initiator A.

Figure 9:
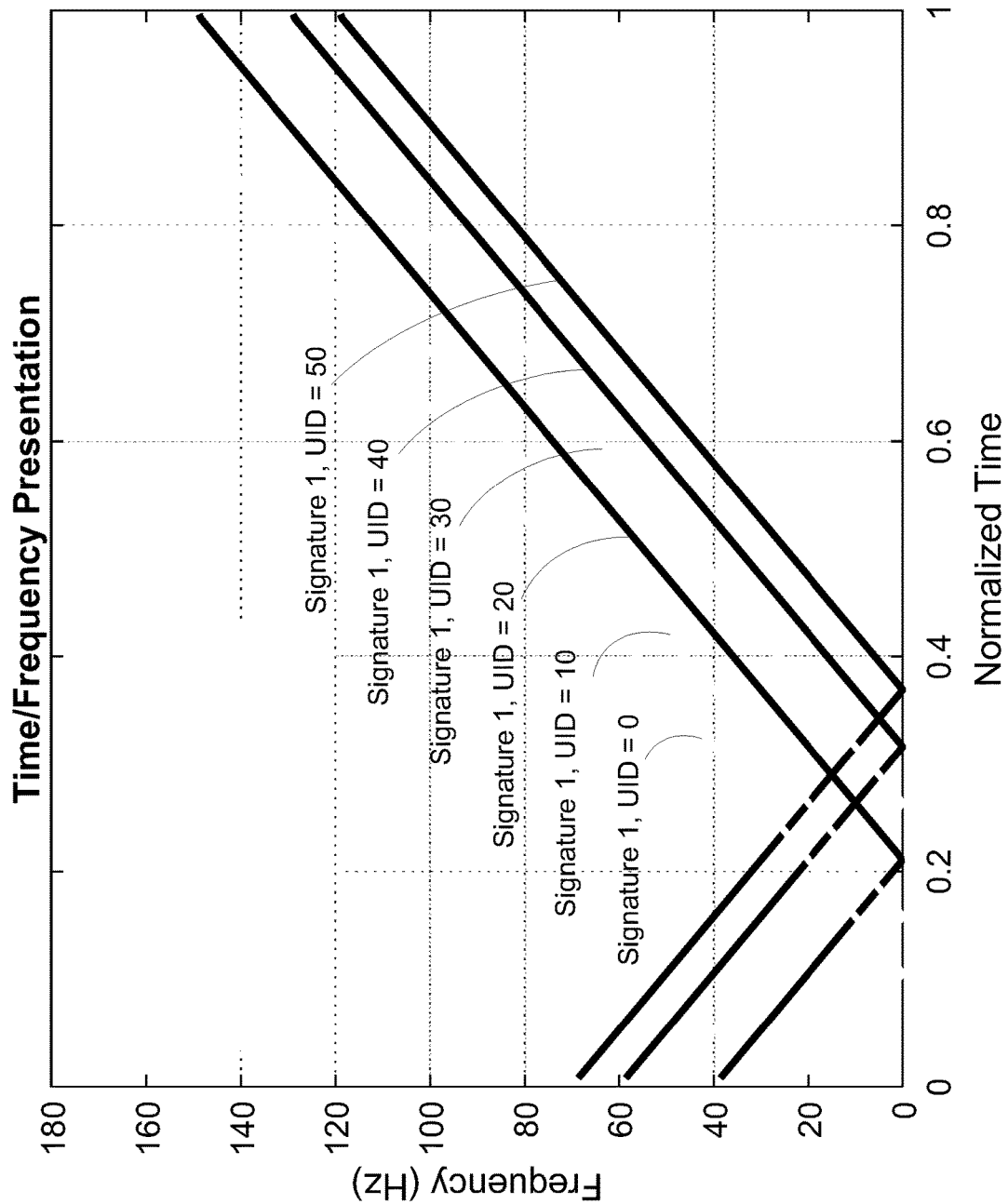
FIG. 9 illustrates the signature characteristics of several orthogonal chirps as signatures that exhibit the same rate of frequency variation over a chirp duration, in accordance with one aspect of the present disclosure.

FIG. 9 illustrates the signature characteristics of several orthogonal chirps that exhibit the same rate of frequency variation over a chirp duration, in accordance with one aspect of the present disclosure. The multiple chirps are orthogonal and may be used for the multi-reflector ranging application illustrated in FIG. 7.

In FIG. 9, the SF and EF for the multiple signature chirps may be the same but the UID for the multiple chirps may be different. For example, the UID for the multiple chirps may range from 0 to 50 in resolution of 10. The frequency sweep at the start of the chirp duration and the frequency sweep at the end of the chirp duration for the multiple chirps may be staggered due to the different UIDs. However, the total span of frequency sweeps ((SF+EF) or $\Psi$) or the bandwidth ($\Psi$/T) is the same for the multiple chirps.

Figure 10:
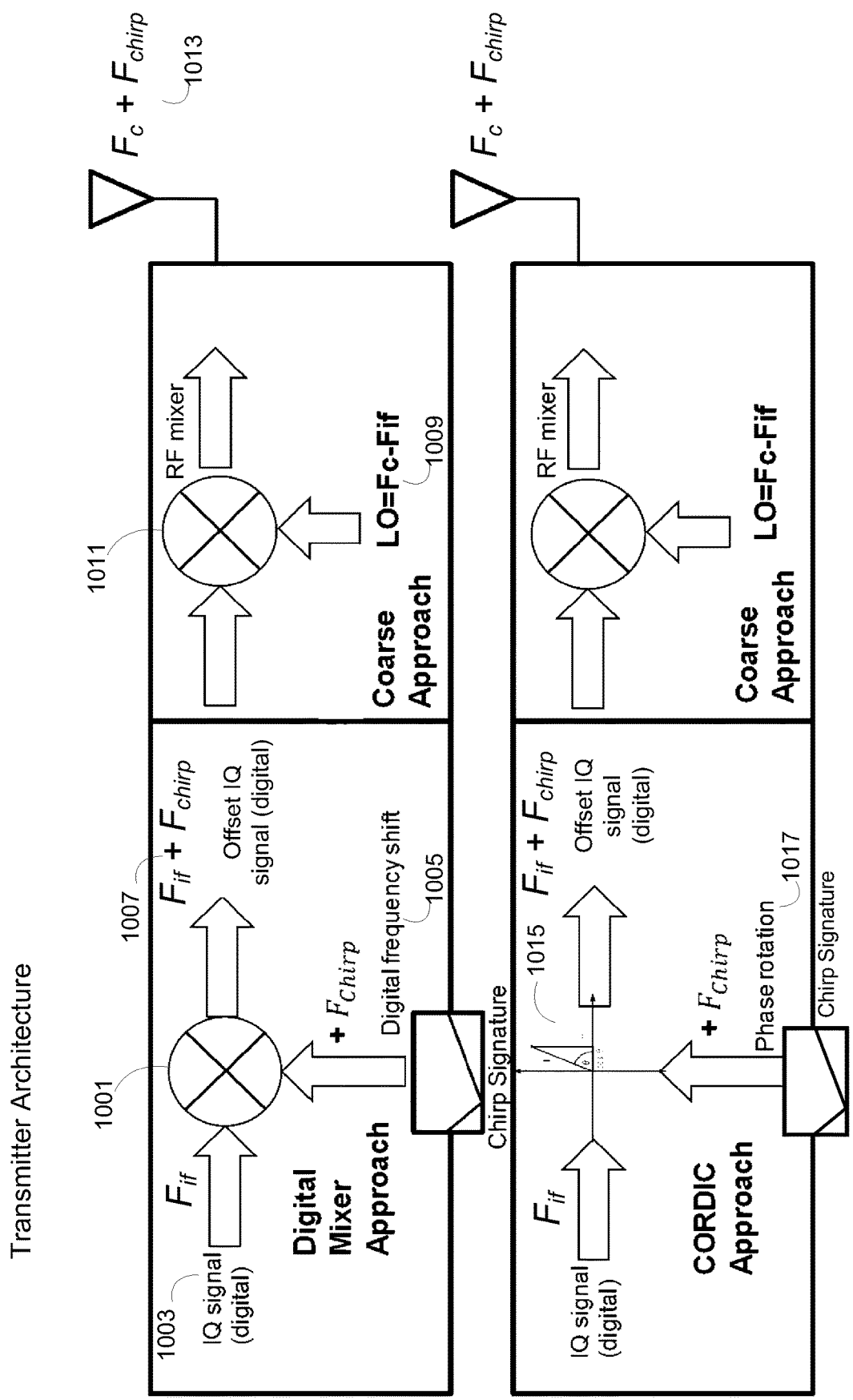
FIG. 10 illustrates techniques for using a digital mixer or a coordinate rotation digital computer (CORDIC) to modulate an intermediate frequency by chirps in the digital domain as signals for phase-based ranging, in accordance with one aspect of the present disclosure.

FIG. 10 illustrates techniques for using a digital mixer 1001 or a coordinate rotation digital computer (CORDIC) 1005 to modulate an intermediate frequency by chirps in the digital domain as signals for phase-based ranging, in accordance with one aspect of the present disclosure. FIG. 10 may be implemented by an initiator or a reflector.

The digital mixer 1001 may mix a digital IQ signal 1003 with a digital frequency shift 1005. For example, digital IQ signal 1003 may represent a signal at an IF frequency $F_{IF}$. The digital frequency shift 1005 may represent the varying frequency sweeps (offsets) of the chirps $F_{chirp}$. In one embodiment, $F_{chirp}$ may be the signature chirps of FIGS. 5-9. Digital mixer 1001 may multiply the digital IQ signal 1003 at $F_{IF}$ with the digital frequency shift 1005 of $F_{chirp}$ represented in the quadrature IQ format to generate an offset digital IQ signal 1007. The offset digital IQ signal 1007 may be at IF frequency ($F_{IF}+F_{chirp}$).

The RF coarse frequency compensation circuit may use an RF mixer 1011 in the RF domain to up-convert the offset digital IQ signal 1007 that has been converted into an analog signal with an LO signal 1009 generated from a phase locked loop (PLL). The LO signal 1009 may be at ($F_C-F_{IF}$), where $F_C$ represents the center frequency of the channel used to carry the UP signal. The output from the RF mixer 1011 may be at RF frequency (($F_C-F_{IF}$)+($F_{IF}+F_{chirp}$)) or ($F_C+F_{chirp}$) 1013, representing the center frequency of the channel offset by the signature chirps. The RF frequency ($F_C+F_{chirp}$) 1013 may be transmitted for phase-based ranging applications. In one aspect, $F_C$ may be fixed for a timeslot and $F_{chirp}$ may be sweeping over a range of frequencies over the timeslot.

Alternatively, the CORDIC 1015 may mix the digital IQ signal 1003 at $F_{IF}$ with a phase rotation 1017 to offset the $F_{IF}$ by the signature chirps. The phase rotation 1017 may represent the $F_{chirp}$ in the phase format. To facilitate the coordinate rotation, the CORDIC 1015 may convert the digital IQ signal 1003 at $F_{IF}$ also into the phase format so that the phase of $F_{IF}$ may be summed with the phase of $F_{chirp}$. The CORDIC 1015 may convert the result of the frequency offset back to the quadrature IQ format to represent the offset digital IQ signal 1007 at IF frequency ($F_{IF}+F_{chirp}$).

The RF coarse frequency compensation circuit associated with the CORDIC 1015 may operate in the same way as that for the digital mixer 1001 to mix the offset digital IQ signal 1007 that has been converted into an analog signal with the LO signal 1009 at ($F_C-F_{IF}$) in the RF domain to generate the RF ($F_C+F_{chirp}$) 1013. The implementations of the digital mixer 1001 and the CORDIC 1015 give the same results but may differ in area, cost, and complexity depending on the number of bits of the $F_{IF}$, the number of bits of the $F_{chirp}$, and the number of bits of the offset digital IQ signal 1007.

Figure 11:
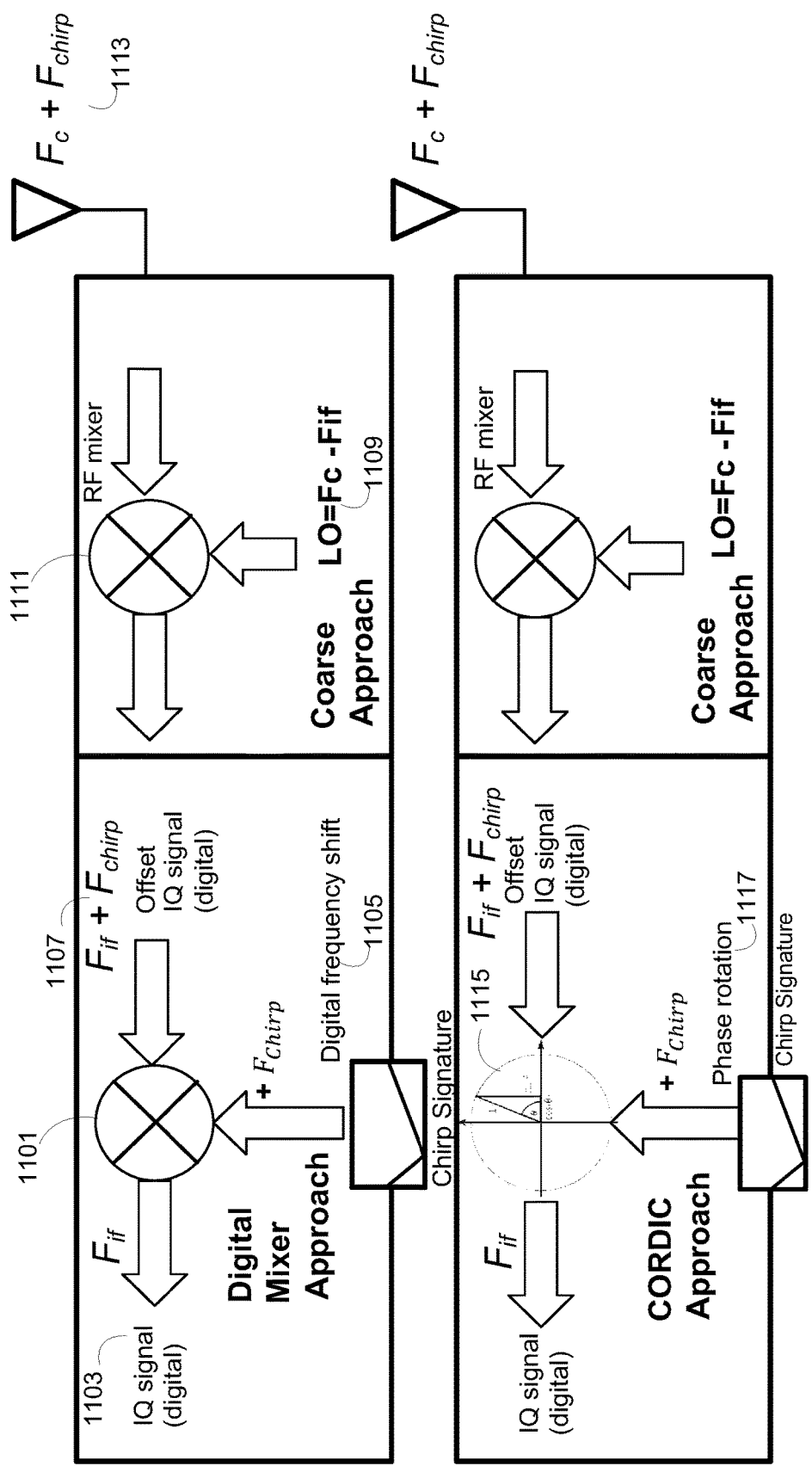
FIG. 11 illustrates techniques for using a digital mixer or a CORDIC to remove chirps from an intermediate frequency in the digital domain when receiving a chirp modulated pulse signal for phase-based ranging, in accordance with one aspect of the present disclosure.

FIG. 11 illustrates techniques for using a digital mixer 1101 or a CORDIC 1115 to remove chirps from an intermediate frequency in the digital domain when receiving a chirp modulated pulse signal for phase-based ranging, in accordance with one aspect of the present disclosure. FIG. 11 may be implemented by an initiator or a reflector.

The RF coarse frequency compensation circuit may receive the UP signal at the center frequency of the channel $F_C$ used to carry the UP signal offset by the signature chirps represented as RF frequency ($F_C+F_{chirp}$) 1113. The RF coarse frequency compensation circuit may use an RF mixer 1111 in the RF domain to down-convert ($F_C+F_{chirp}$) 1113 with an LO signal 1109 generated from a phase locked loop (PLL). The LO signal 1009 may be at ($F_C-F_{IF}$), where $F_{IF}$ represents an IF frequency. The output from the RF mixer 1111 may be the offset IQ signal 1107 at (($F_C+F_{IF}$)−($F_{IF}-F_{chirp}$)) or at IF frequency ($F_{IF}+F_{chirp}$).

The digital mixer 1101 may mix the offset IQ signal 1107 that has been converted into the digital domain with a digital frequency shift 1105. The digital frequency shift 1105 may represent the varying frequency sweeps of the chirps $F_{chirp}$. In one embodiment, $F_{chirp}$ may be the signature chirps of FIGS. 5-9. Digital mixer 1001 may multiply the digital offset IQ signal 1107 at ($F_{IF}+F_{chirp}$) with the digital frequency shift 1105 of $F_{chirp}$ represented in the IQ quadrature format to remove the signature chirps to generate a digital IQ signal 1103 at IF frequency $F_{IF}$. The receiver may measure the phase of the digital IQ signal 1103.

Alternatively, the CORDIC 1115 may mix the digital offset IQ signal 1107 at ($F_{IF}+F_{chirp}$) with a phase rotation 1117 to remove the signature chirps. The phase rotation 1117 may represent the $F_{chirp}$ in the phase format. To facilitate the coordinate rotation, the CORDIC 1115 may convert the offset IQ signal 1107 at ($F_{IF}+F_{chirp}$) also into the phase format so that the phase of ($F_{IF}+F_{chirp}$) may be subtracted by the phase of $F_{chirp}$. The CORDIC 1115 may convert the coordinate rotation back to the quadrature IQ format to generate the digital IQ signal 1103 at IF frequency $F_{IF}$.

Figure 12:
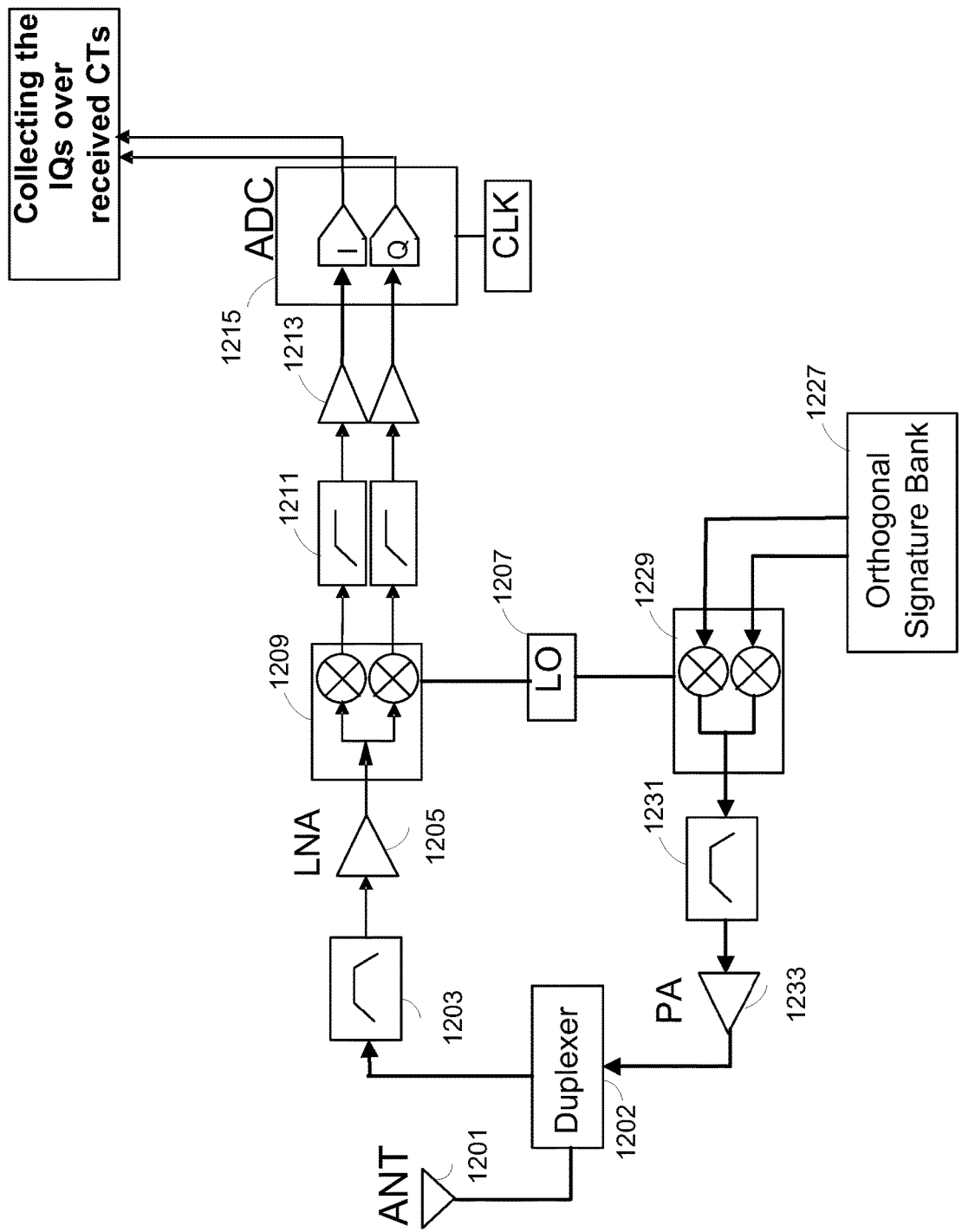
FIG. 12 illustrates a functional block diagram of a transceiver that implements phase-based ranging using chirp modulated pulses, in accordance with one aspect of the present disclosure.

FIG. 12 illustrates a functional block diagram of a transceiver that implements phase-based ranging using chirp modulated pulses, in accordance with one aspect of the present disclosure. FIG. 12 may be implemented by an initiator or a reflector.

When configured as a receiver, the transceiver may receive a BLE signal containing an UP signal offset by signature chirps for phase measurements. An antenna 1201 may receive the BLE signal. A duplexer may provide isolation between the received BLE signal and a transmit BLE signal path. An RF filter 1203 centered at the frequency channel of the received signal may filter the receive signal to generate a filtered RF signal containing the signature chirp. A low noise amplifier (LNA) 1205 may amplify the filtered RF signal. A down-converter 1209 may mix the amplified and filter RF signal with a local oscillator (LO) 1207 tuned to the center frequency of the channel to remove the signature chirps to generate a down-converted quadrature signal. In one embodiment, down-converter 1209 may be implemented using the techniques of FIG. 11. A low pass filter 1211 may filter the down-converted quadrature signal to generate an IF or a baseband quadrature signal. An amplifier 1213 may amplify the IF or baseband quadrature signal to generate an amplified IF or baseband quadrature signal. An analog-to-digital converter (ADC) 1215 may sample the amplified IF or baseband quadrature signal with a sampling clock to generate a digital IF or baseband quadrature signal. The digital IF or baseband quadrature signal may represent the quadrature samples of the UP signal and may be sampled to measure the phase.

When configured as a transmitter, the transceiver may transmit an UP signal modulated by signature chirps for phase measurements in different time slots. An orthogonal signature chirp bank 1227 may acquire and generate a desired signal in baseband or IF. An up-converter 1229 may mix the signal from the orthogonal chirp bank 1227 with LO 1207 tuned to the center frequency of a channel to modulate the pulse with the signature chirps and generate an up-converted signal at RF. In one embodiment, up-converter 1229 may be implemented using the techniques of FIG. 10. An RF filter 1231 may filter the up-converted modulated pulse signal to generate an RF signal. A power amplifier (PA) 1233 may amplify the RF signal to generate a transmit signal. The duplexer 1202 may supply the transmit signal to the antenna 1401 for transmission.

Figure 13:
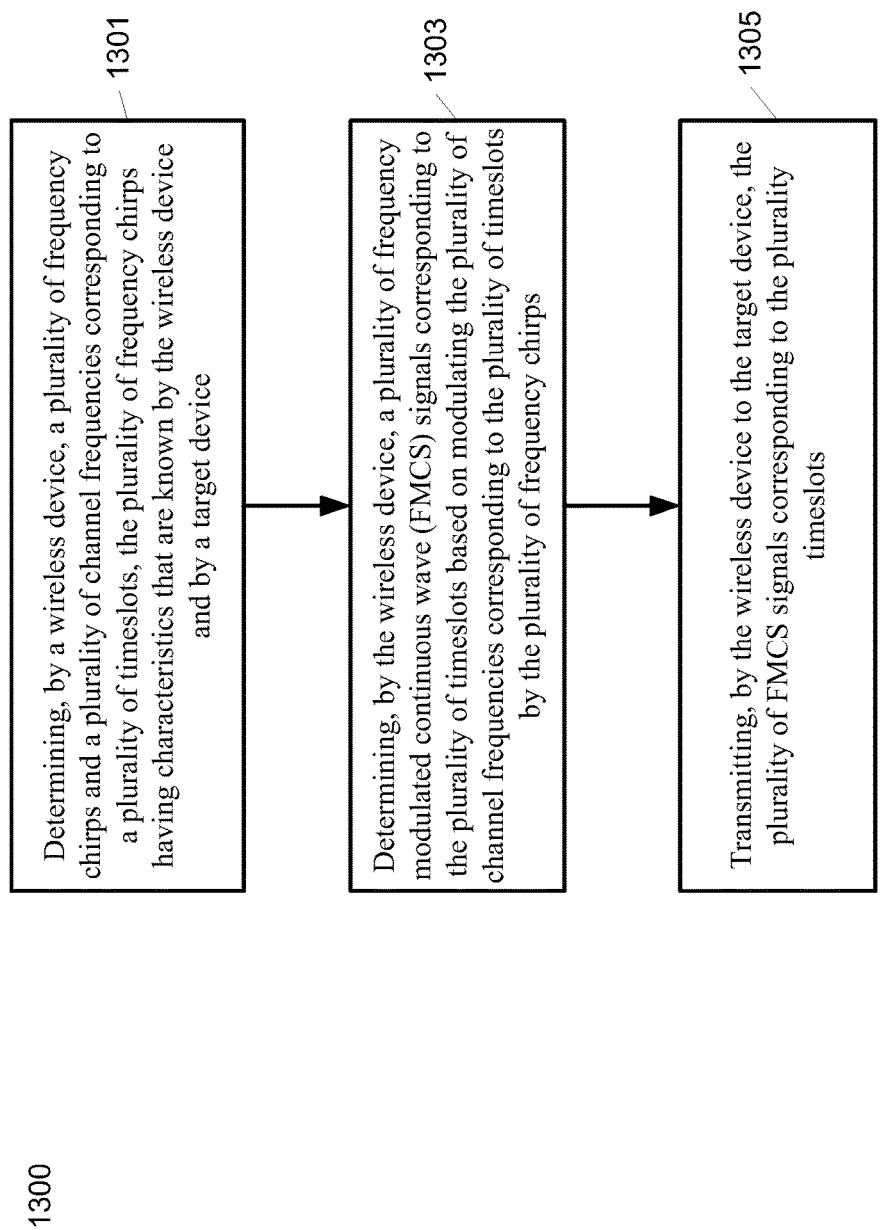
FIG. 13 illustrates a flow diagram of a method for operating a device to generate and transmit chirp modulated pulses in multiple timeslots of a ranging cycle to support secure multi-carrier phase-based ranging between the device and a target device, in accordance with one aspect of the present disclosure.

FIG. 13 illustrates a flow diagram of a method 1300 for operating a device to generate and transmit chirp modulated pulses in multiple timeslots of a ranging cycle to support secure multi-carrier phase-based ranging between the device and a target device, in accordance with one aspect of the present disclosure. In one aspect, the method 1300 may be performed by the device utilizing hardware, software, or combinations of hardware and software.

In operation 1301, the device may determine a multitude of frequency chirps and a multitude of channel frequencies corresponding to a multitude of timeslots. The multitude of frequency chirps have characteristics that are known by the device and by a target device.

In operation 1303, the device may determine a multitude of frequency modulated continuous wave (FMCW) signals corresponding to the multitude of timeslots based on modulating the multitude of channel frequencies corresponding to the multitude of timeslots by the multitude of frequency chirps.

In operation 1305, the device may transmit the multitude of frequency modulated continuous wave signals corresponding to the multitude of timeslots to the target device.

Various embodiments of the multi-carrier phase-based ranging system described herein may include various operations. These operations may be performed and/or controlled by hardware components, digital hardware and/or firmware/programmable registers (e.g., as implemented in computer-readable medium), and/or combinations thereof. For example, the operations may be performed by a general-purpose computer or a processing system executing computer program stored in a computer-readable medium. The methods and illustrative examples described herein are not inherently related to any particular device or other apparatus. Various systems (e.g., such as a wireless device operating in a near or long field environment, pico area network, wide area network, etc.) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of operations by a wireless device, comprising:
   determining a plurality of frequency chirps and a plurality of channel frequencies corresponding to a plurality of timeslots, the plurality of frequency chirps having characteristics that are known by the wireless device and by a target device;
   determining a plurality of frequency modulated continuous wave (FMCW) signals corresponding to the plurality of timeslots based on modulating the plurality of channel frequencies corresponding to the plurality of timeslots by the plurality of frequency chirps; and
   transmitting, by the wireless device to the target device, the plurality of FMCW signals corresponding to the plurality of timeslots for estimating a distance between the wireless device and the target device based on phase measurements of the plurality of channel frequencies.

2. The method of claim 1, wherein the characteristics of the plurality of frequency chirps and the plurality of channel frequencies for the plurality of timeslots are randomized.

3. The method of claim 1, wherein determining the plurality of frequency chirps comprises:
   generating pseudo-random numbers based on a shared key and a time-varying initialization vector, wherein the shared key and the time-varying initialization vector are known to both the wireless device and the target device; and
   determining the characteristics of the plurality of frequency chirps based on the pseudo-random numbers.

4. The method of claim 3, wherein the time-varying initialization vector comprises a time reference associated with the plurality of timeslots.

5. The method of claim 1, wherein the characteristics of each of the plurality of frequency chirps comprise a starting frequency sweep and an end frequency sweep randomly selected from a range of possible frequency sweep variation, and wherein the plurality of channel frequencies is randomly selected from a range of channel bandwidth.

6. The method of claim 5, wherein determining the plurality of FMCW signals corresponding to the plurality of timeslots comprises:
   determining a starting carrier frequency by modulating the channel frequency for each of the plurality of timeslots by the starting frequency sweep corresponding to each of the plurality of timeslots;
   determining an end carrier frequency by modulating the channel frequency for each of the plurality of timeslots by the end frequency sweep corresponding to each of the plurality of timeslots; and
   varying the carrier frequency linearly from the starting carrier frequency to the end carrier frequency over a duration of each of the plurality of timeslots.

7. The method of claim 1, further comprising:
   determining, for each of a plurality of target devices, a plurality of FMCW signals corresponding to the plurality of timeslots based on modulating the plurality of channel frequencies corresponding to the plurality of timeslots by a plurality of frequency chirps unique to each of the plurality of target devices, wherein the plurality of frequency chirps unique to each of the plurality of target devices have characteristics that are known by the wireless device and, respectively, only by each of the plurality of target devices; and
   transmitting, simultaneously by the wireless device to the plurality of target devices, the plurality of FMCW signals associated with each of the plurality of target devices corresponding to the plurality of timeslots.

8. The method of claim 7, wherein the plurality of FMCW signals transmitted simultaneously to the plurality of target targets devices are orthogonal over a duration of each of the plurality of timeslots.

9. The method of claim 7, wherein the characteristics of each of the plurality of orthogonal frequency chirps comprise a starting frequency sweep and an end frequency sweep randomly selected from a range of possible frequency sweep variation, and a user identification number randomly associated with each of the plurality of target devices.

10. The method of claim 1, further comprising:
    determining a receiving FMCW signal corresponding to each of a plurality of receiving timeslots based on characteristics of a plurality of receiving frequency chirps and the plurality of channel frequencies corresponding to the plurality of receiving timeslots; and
    receiving, by the wireless device from the target device, the receiving FMCW signal corresponding to each of the plurality of receiving timeslots to estimate a distance to the target device.

11. An apparatus comprising:
    a processing system configured to:
    determine a plurality of frequency chirps and a plurality of channel frequencies corresponding to a plurality of timeslots, the plurality of frequency chirps having characteristics that are known by the apparatus and by a target device; and
    determine a plurality of frequency modulated continuous wave (FMCW) signals corresponding to the plurality of timeslots based on modulating the plurality of channel frequencies corresponding to the plurality of timeslots by the plurality of frequency chirps; and
    a transceiver configured to transmit to the target device the plurality of FMCW signals corresponding to the plurality of timeslots for estimating a distance between the apparatus and the target device based on phase measurements of the plurality of channel frequencies.

12. The apparatus of claim 11, wherein the characteristics of the plurality of frequency chirps and the plurality of channel frequencies for the plurality of timeslots are randomized.

13. The apparatus of claim 11, wherein to determine the plurality of frequency chirps, the processing system is configured to:
  generate pseudo-random numbers based on a shared key and a time-varying initialization vector, wherein the shared key and the time-varying initialization vector are known to both the apparatus and the target device; and
  determine the characteristics of the plurality of frequency chirps based on the pseudo-random number.

14. The apparatus of claim 13, wherein the time-varying initialization vector comprises a time reference associated with the plurality of timeslots.

15. The apparatus of claim 11, wherein the characteristics of each of the plurality of frequency chirps comprise a starting frequency sweep and an end frequency sweep randomly selected from a range of possible frequency sweep variation, and wherein the plurality of channel frequencies is randomly selected from a range of channel bandwidth.

16. The apparatus of claim 15, wherein to determine the plurality of FMCW signals corresponding to the plurality of timeslots, the processing system is configured to:
  determine a starting carrier frequency by modulating the channel frequency for each of the plurality of timeslots by the starting frequency sweep corresponding to each of the plurality of timeslots;
  determine an end carrier frequency by modulating the channel frequency for each of the plurality of timeslots by the end frequency sweep corresponding to each of the plurality of timeslots; and
  vary the carrier frequency linearly from the starting carrier frequency to the end carrier frequency over a duration of each of the plurality of timeslots.

17. The apparatus of claim 11, wherein the processing system is further configured to:
  determine, for each of a plurality of target devices, a plurality of FMCW signals corresponding to the plurality of timeslots based on modulating the plurality of channel frequencies corresponding to the plurality of timeslots by a plurality of frequency chirps unique to each of the plurality of target devices, wherein the plurality of frequency chirps unique to each of the plurality of target devices have characteristics that are known by the apparatus and, respectively, only by each of the plurality of target devices; and
  wherein the transceiver is further configured to transmit simultaneously to the plurality of target devices the plurality of FMCW signals associated with each of the plurality of target devices corresponding to the plurality timeslots, wherein the plurality of FMCW signals transmitted simultaneously to the plurality of target targets devices are orthogonal over a duration of each of the plurality of timeslots.

18. The apparatus of claim 17, wherein the characteristics of each of the plurality of orthogonal frequency chirps comprise a starting frequency sweep and an end frequency sweep randomly selected from a range of possible frequency sweep variation, and a user identification number randomly associated with each of the plurality of target devices.

19. The apparatus of claim 11, wherein the processing system is further configured to:
  determine a receiving FMCW signal corresponding to each of a plurality of receiving timeslots based on characteristics of a plurality of receiving frequency chirps and the plurality of channel frequencies corresponding to the plurality of receiving timeslots; and
  wherein the transceiver is further configured to receive from the target device the receiving FMCW signal corresponding to each of the plurality receiving timeslots to enable the processing system to estimate a distance to the target device.

20. A system comprising:
  an initiator device configured:
  determine a plurality of frequency chirps and a plurality of channel frequencies corresponding to a plurality of initiator transmitting timeslots and a plurality of reflector transmitting timeslots based on a shared key and a time-varying initialization vector known to both the initiator and a reflector device;
  determine a plurality of frequency modulated continuous wave (FMCW) signals corresponding to the plurality of initiator transmitting timeslots or the plurality of reflector transmitting timeslots based on modulating the plurality of the channel frequencies by the plurality of frequency chirps;
  transmit to the reflector device the plurality of FMCW signals corresponding to the plurality of initiator transmitting timeslots; and
  receive from the reflector device the plurality of FMCW signals corresponding to the plurality of reflector transmitting timeslots to estimate a distance to the reflector device based on phase measurements of the plurality of channel frequencies; and
  the reflector device configured to:
  determine the plurality of frequency chirps and the plurality of channel frequencies corresponding to the plurality of initiator transmitting timeslots and the plurality of reflector transmitting timeslots based on the shared key and the time-varying initialization vector;
  determine the plurality of FMCW signals corresponding to the plurality of initiator transmitting timeslots or the plurality of reflector transmitting timeslots based on modulating the plurality of the channel frequencies by the plurality of frequency chirps;
  transmit to the initiator device the plurality of FMCW signals corresponding to the plurality of reflector transmitting timeslots; and
  receive from the initiator device the plurality of FMCW signals corresponding to the plurality of initiator transmitting timeslots to estimate a distance to the initiator device.

* * * * *